United States Patent [19]
Werth

[11] Patent Number: 5,473,708
[45] Date of Patent: Dec. 5, 1995

[54] PATTERN PROCESSING SYSTEM USING MINIMUM LENGTH ADDRESS LOOPS

[75] Inventor: Larry J. Werth, Eagan, Minn.

[73] Assignee: Electro-Sensors, Inc., Eden Prairie, Minn.

[21] Appl. No.: 107,401

[22] Filed: Aug. 16, 1993

[51] Int. Cl.$^6$ .................................................... G06K 9/62
[52] U.S. Cl. ............................................ 382/160; 382/228
[58] Field of Search ................................ 382/14, 15, 37, 382/36, 41, 49, 70, 155, 159, 160, 161, 225, 226, 228, 229, 305

[56] References Cited

U.S. PATENT DOCUMENTS

| | | | |
|---|---|---|---|
| 4,504,970 | 3/1985 | Werth et al. | 382/14 |
| 4,541,115 | 9/1985 | Werth | 382/14 |
| 4,550,431 | 10/1985 | Werth et al. | 382/27 |
| 4,551,850 | 11/1985 | Werth et al. | 382/14 |

*Primary Examiner*—Joseph Mancuso
*Attorney, Agent, or Firm*—Schwegman, Lundberg & Woessner

[57] ABSTRACT

A pattern processing system associates image input patterns with desired response codes. The image input is stored in an image buffer as an addressable array of sample values. An address sequencer provides a sequence of addresses (or "address stream") to the image buffer and to a response memory. The next address provided by the address sequencer is based upon the current address and the state of the sample value stored in the image buffer at the location corresponding to the current address. Once the address sequencer repeats and address, the address stream is in a repetitive address loop as long as the image stored in the image buffer remains constant. The address loop continues to be generated since the address sequencer always produces the same next address based upon the same current address and the same sample value stored at that current address. During a training mode, a pattern to be recognized is supplied to the image buffer and a training code representing a desired response is written into the response memory at selected locations that correspond to addresses in the address loop being generated. During a later recognition mode, when the same pattern is supplied to the image buffer, the same address loop is again generated. The previously stored training codes are read from the response memory. A response detector provides a response code output representative of the pattern based upon the most frequent code read out from the response memory.

42 Claims, 7 Drawing Sheets

IMAGE BUFFER 12

| 1 0 | 2 0 | 3 1 |
|---|---|---|
| 4 0 | 5 1 | 6 0 |
| 7 1 | 8 0 | 9 0 |

PATTERN A

| 1 1 | 2 0 | 3 1 |
|---|---|---|
| 4 1 | 5 0 | 6 1 |
| 7 1 | 8 0 | 9 1 |

PATTERN B

ADDRESS SEQUENCER 14

| 1 8 | 2 5 | 3 7 |
|---|---|---|
| 4 1 | 5 1 | 6 9 |
| 7 6 | 8 3 | 9 8 |

NEXT ADDRESS IF SAMPLE VALUE=0

| 1 9 | 2 8 | 3 6 |
|---|---|---|
| 4 7 | 5 8 | 6 5 |
| 7 5 | 8 4 | 9 2 |

NEXT ADDRESS IF SAMPLE VALUE=1

RESPONSE MEMORY 16

| 1 B | 2 B | 3 A |
|---|---|---|
| 4 | 5 B | 6 A |
| 7 | 8 A | 9 B |

PRIOR ART

FIG. 2

PATTERN PROCESSING SYSTEM USING MINIMUM LENGTH ADDRESS LOOPS

RELATED CASES

This application is related to U.S. patent application Ser. No. 08/107,100, entitled, "Pattern Processing System with Weighted Training Codes," to Werth, filed Aug. 16, 1993.

FIELD OF THE INVENTION

This invention relates to systems for identifying patterns, and more particularly, to an improvement in an "address loop" pattern processing system.

DESCRIPTION OF THE PRIOR ART

U.S. Pat. No. 4,541,115 to Werth entitled "Pattern Processing System," issued Sep. 10, 1985 and hereby incorporated herein in its entirety, discloses a pattern processing system wherein an image input pattern is identified based upon an address loop which is generated when individual values of the input pattern are addressed sequentially (the "Werth system"). As shown in FIG. 1, the system 10 includes an image buffer 12 for storing the image input pattern, an address sequencer 14 for sequentially addressing the image buffer 12, and an identifying circuit or module comprising training controller 18, response memory 16 and response detector 20. The identifying module is responsive to the address stream generated by the address sequencer to identify the image input pattern based upon the address loop which is generated.

The image buffer 12 stores sample values representative of the image input pattern in a first array of addressable locations. This first array is addressed by the address stream produced by the addresser sequencer 14. The address sequencer 14 determines the next address in the sequence based upon at least one preceding address and the sample value(s) which are stored by the image buffer 12 at the location which corresponds to the preceding address(es). As a result, when an address which has previously been provided in the sequence is repeated, the address stream cycles repetitively through an address loop. Because the next address is always determined by the preceding address and the sample value, the address loop generated is a function of the image input pattern. This address loop is used to identify the image input pattern.

In other words, the basis of the Werth system is that a repetitive address loop is generated by the address sequencer, and that this address loop characterizes the image input pattern which is present. Because the address sequencer determines the next address of the sequence based upon a preceding address and the sample value stored by the addressable input buffer at the location corresponding to that preceding address, a repetitive address loop will be produced as long as the input pattern does not change. The particular addresses contained in the address loop are a function of the input pattern, and are used to identify that pattern each time it occurs.

In preferred embodiments, the response memory 16 contains an array of addressable locations which are addressed by the address stream produced by the address sequencer 14. During a training mode, a pattern to be identified is presented, and the training controller 18 causes a training code to be written into selected locations in the second array which are addressed by the sequence of addresses. The training code represents a desired output response to be produced when that pattern is present.

When the image input pattern is later provided as input to the pattern processing system, the address sequencer 14 again addresses the first array and the second array. The response detector 20 provides an output response based upon the training codes which are read out from locations addressed by the address stream.

Address sequencer 14 of the Werth system can take several different forms. In one embodiment, address sequencer 14 is a pseudo-random number generator which computes the next address based upon the current address and the sample value. In another embodiment, address sequencer 14 is a read only memory (ROM) with associated logic. The ROM contains a next address for each possible input combination (current address and sampled value). In either embodiment, the sampling rules governing operation of address sequencer 14 are consistent. That is, resampling of an address always results in the same next address if the sample value is unchanged. Where the sample value is either a "1" or a "0", address sequencer 14 provides one address if the sample value is a "1" and a different address if the sample value is "0". Each time address sequencer 14 produces a particular address and it receives a sample value of "1", it will always sequence to one predetermined next address. Similarly, whenever the address sequencer 14 is at the particular address and receives a sample value of "0", it will always sequence to another (different) predetermined next address.

The output of address sequencer 14, therefore, is a continuous stream of addresses, and its input is a continuous stream of sample values from image buffer 12. The basis of operation of the system 10 of the present invention is that an "address loop" will be generated which characterizes the image input pattern which is present. Because the sampling rules which govern the address produced by address sequencer 14 are consistent, once address sequencer 14 repeats an address, it will repeat the same sequence of addresses and will remain in this address loop as long as the image input to image buffer 12 is unchanged.

To illustrate the operation of the pattern processing system 10 FIG. 1, an extremely simple example illustrated in FIG. 2 will be used. In this simple example, it is assumed that image buffer 12 stores the image input in the form of a nine-bit binary pattern, and that the pattern processing system is expected to distinguish between "Pattern A" and "Pattern B" shown in FIG. 2. Pattern A contains "1" at address Nos. 3, 5 and 7; and "0" at address Nos. 1, 2, 4, 6, 8 and 9. Pattern B contains "1" at address Nos. 1, 3, 4, 6, 7 and 9; and "0" at address Nos. 2, 5 and 8.

FIG. 2 also includes an illustration of the next addresses generated by address sequencer 14, depending upon whether the sample value from image buffer 12 is "0" or "1". For example, if address No. 2 contains a "0", the next address generated by address sequencer 14 is address No. 5. If the sample value at address No. 2 is a "1", the next address generated by address sequencer 14 is address No. 8.

In the single example, it is also assumed that address sequencer 14 begins with address No. 1. When Pattern A is present in image buffer 12, address sequencer 14 generates the following address stream: "1, 8, 3, 6, 9,8, 3, 6, 9, 8 . . . ." The address loop which is generated is "8, 3, 6, 9". For this example, the same address loop is generated regardless of where address sequencer 14 starts. After several addresses have been produced, eventually address sequencer 14 reaches address No. 8. It then locks in on the sequence "8, 3, 6, 9 . . . " and will remain in that address loop as long as Pattern A is present.

In the case of Pattern B, address sequencer 14 generates the following address stream: "1, 9, 2, 5, 1, 9, 2, 5, 1 . . . ." The address loop generated is "1, 9, 2, 5".

During training, a training code input of either "A" or "B" is written into response memory 16 by training controller 18. In this example, it is assumed that Pattern A was presented first during training. It is further assumed that training controller 18 causes the training code input to be stored at all locations of response memory 16 which are addressed. In this example, therefore, training code "A" is written into locations 1, 8, 3, 6 and 9 because the sequence of addresses began with address No. 1, and because the remaining addresses all constitute part of the address loop.

In actual applications, assignment of training codes to transition addresses (addresses before entering a loop address) can easily be avoided or minimized. First, the input pattern is generally presented before training is initiated through controller 104 and therefore, due to the speed of the address sequencer 14, a loop would already have been generated. Second, in an application where the input pattern may be changing during training, a periodic (in time) assignment of the training code can be selected and, since loop addresses occur repeatedly and transition addresses do not, most of the training code assignments will be to addresses in loops.

When Pattern B was presented subsequently during training, the training code input "B" was written into response memory 16 by training controller 18 at locations 1, 9, 2 and 5. In this case, training controller 18 caused the training code "B" to be written over the previously stored training code "A" at address No. 1 and address No. 9.

The contents of response memory 16, after training has been completed, is illustrated in FIG. 2. Training code "A" is stored at address Nos. 3, 6 and 8, while training code "B" is stored at address Nos. 1, 2, 5 and 9.

In this example, the image input is presented during normal operation in the form of either Pattern A or Pattern B. The sequential addressing of image buffer 12 and response memory 16 is again performed by address sequencer 14. If Pattern A is present, address sequencer 14 again generates the address loop "8, 3, 6, 9, 8, 3, 6, 9, 8 . . . ." This causes the response memory 16 to be read out as "A, A, A, B, A, A, A, B, A . . . ."

If Pattern B is present, address sequencer 14 again generates the address loop "1, 9, 2, 5, 1, 9, 2, 5, 1 . . . ." The output of response memory 16 is then "B, B, B, B, B, B, B, B, B . . . ".

Response detector 120 monitors the output of response memory 16, and determines which of the two codes read out from response memory 16 was produced most frequently. When Pattern A was presented to image buffer 12, the output of response memory 16 was most frequently "A". When the image input to image buffer 12 was Pattern B, the output of response memory 16 is most frequently "B". Response detector 120 provides the response code output of either "A" or "B" depending upon the frequency of occurrence of the particular code read out from response memory 16.

From this simple example, it can be seen that the present invention provides an association between a training code input and an image input which causes pattern processing system 10 to generate the same response code whenever the same input image is presented to the image buffer 12. Of course, in practical applications, the number of sample values of the image input is much greater than the nine values which are used in the example of FIG. 2, and both image buffer 12 and response memory 16 are capable of storing much larger arrays of data. Also, more than one address loop may be possible for a particular image input (e.g. 7.5 loops are expected for an image of 1,000,000 samples) in which case response memory addresses in each loop would be assigned the training code. The operation described in this example, however, applies to larger input images as well. TABLE 1 shows that even for very large arrays of image input sample values, the expected number of addresses in loops is very small.

It can be seen that the association of a desired response (in the form of a training code input) with a particular image input is not dependent upon any complicated or specialized computer software. In fact, the association between the training code input and the image input is provided by hardware, and is independent of the particular source of the image input (visual, audio or tactile). This makes the pattern processing system of the present invention applicable to a wide variety of different pattern recognition tasks.

The generation of address loops by the address sequencer 14 and the image buffer 12 has important statistical implications which result in a dramatic data reduction. Any arbitrary input pattern, even if it contains a very large number of data points, generates only a very small number of statistically probable address loops. The Werth system uses the data reduction provided by the address loops to associate an input pattern with a desired response.

The following statistical analysis assumes that the address sequencer is capable of generating addresses between "1" and "X" at random. It is also assumes that an image input pattern containing X sample values is stored in image buffer 12, so that for each address generated by address sequencer 14, there is only one next address.

In the following equations and in Table 1, the following definitions apply:

X=Sequencer size, i.e. the number of addresses.

$Y_x$=Expected number of addresses in loops.

$(Y_x i)$=Expected number of addresses in loops of length i $Z_x$=Expected total number of loops.

$Z_{(xi)}$=Expected total number of loops of length i

For any given number of addresses (X), it is possible to determine statistically the expected number of addresses in loops ($Y_x$) and the expected total number of loops ($Z_x$). From the definitions above, the following relations are derived:

$$y_{(x}i) = iz_x i \tag{1}$$

$$(Y_x i) = \sum_{i=1}^{X} y_x i \tag{2}$$

$$(Z_x i) = \sum_{i=1}^{X} z_x i \tag{3}$$

If a sequencer address is selected at random, the probability $P_x^i$ that it is part of a loop length i is given by:

$$p_x i = \frac{X-1}{X} \cdot \frac{X-2}{X} \cdots \frac{X-i+1}{X} \cdot \frac{1}{X} \tag{4}$$

This is because there must be i-1 successor addresses in the loop which are different from the one selected, and the final successor address must close the loop.

The total number of expected addresses in loops is:

$$y(xi) = Xp(xi) = \frac{(X-1)!}{X^{i-1}(x-i)!} \tag{5}$$

Substituting Eq. (5) into Eqs. (2) and (3):

$$X = \sum_{i=1}^{X} \frac{(X-1)!}{X^{i-1}(X-i)!} \tag{6}$$

$$Z_X = \sum_{i=1}^{X} \frac{(X-1)!}{iX^{i-1}(X-i)!} \tag{7}$$

Using Eqs. (6) and (7), it is possible to calculate the expected number of addresses in loops $Y_x$ and the expected total number of loops $Z_x$ for any given number of addresses X. Table 1 lists the values of $Y_x$ and $Z_x$ for values of X ranging from 10 to 1,000,000.

TABLE 1

| Total Number of Addresses X | Expected Number of Addresses in Loops $Y_x$ | Expected Number of Loops $Z_x$ |
|---|---|---|
| 10 | 3.66 | 1.91 |
| 100 | 12.2 | 2.98 |
| 1,000 | 39.3 | 4.20 |
| 10,000 | 125 | 5.24 |
| 100,000 | 396 | 6.39 |
| 1,000,000 | 1253 | 7.54 |

From Table 1, the dramatic reduction in data achieved by utilizing the present invention is apparent. If the input image contains 1,000,000 sample points (i.e. X= 1,000,000), only 7.54 possible different loops are statistically expected. The total number of addresses expected to occur in these loops in only 1253, which is a small percentage of the total number of sample points contained in image buffer 12. These loop addresses, however, characterize the total pattern, since the addresses generated by address sequencer 12 are randomly scattered throughout the pattern.

One problem which occurs with the Werth System is that more than one address loop can occur for a single input pattern. As shown by Table 1 of U.S. Pat. No. 4,541,115, if there are 10,000 total addresses there will be 5.24 expected number of address loops for any fixed input pattern. Only one of these address loops can occur at a time. This problem of multiple address loops for a single input pattern results in the following:

(1) The amount of training required can be excessive because all the possible address loops must occur and be trained for each input pattern. A single input pattern may need to be trained many times in an effort to train as many of the address loops as possible.

(2) Recognition errors can occur if an address loop occurs during recognition mode which did not occur during training mode.

(3) Some of the address loops will be very short and therefore the number of sample values taken from the image buffer is too small for reliable recognition. In fact, some loops will only be one address long.

Therefore, there is a need for an method and apparatus for addressing these limitations in the Werth System.

SUMMARY OF THE INVENTION

The present invention solves the problem of multiple address loops for a single input pattern by establishing a minimum length of any address loop generated by the address sequencer. The invention, in turn, reduces the probability of there being multiple address loops for a given input pattern. According to one embodiment, a minimum address loop length controller is provided, and prevents the address sequence from entering a loop that includes less than a predetermined number of addresses.

BRIEF DESCRIPTION OF THE DRAWINGS

FIG. 2 illustrates a simplified example of the operation of the pattern processing system of FIG. 1, including illustrations of two different image input patterns A and B which can be contained in the image buffer, diagrams illustrating the next address produced by the address sequencer depending upon whether the current address location of the image buffer contains a "0" or a "1", and an illustration of the contents of the response memory as a result of operation of the pattern processing system of FIG. 1.

DETAILED DESCRIPTION OF THE PREFERRED EMBODIMENTS

In the following detailed description of an example embodiment of the invention, reference is made to the accompanying drawings which form a part hereof, and which is shown by way of illustration only, specific embodiments in which the invention may be practiced. It is to be understood that other embodiments may be utilized and structural changes may be made without departing from the scope of the present invention.

The invention solves the problem of multiple address loops for a single input pattern. Its implementation establishes the minimum length of any address loop generated by the address sequencer 14. In other words, the number of addresses which comprise an address loop will always be greater than some minimum value. The ability to specify the minimum address loop influences the probability of there being multiple address loops. As the minimum address loop length is increased, the probability that there exists another address loop (also with minimum length) decreases. Consider an address sequencer 14 with a total number of addresses of 10,000 and a minimum address loop of 200. There will always be at least 200 addresses of the 10,000 which belong to a loop. If the embodiment of the address sequencer is a pseudo random number generator then each address has an equal probability of being part of an address loop; in this case, 200 of 10,000 addresses for a probability of 0.02. For there to exist another loop of 200 or more, the address sequencer would need to generate 200 random addresses without sampling one of the 200 addresses which are already in a loop. With each address generated, the probability of not generating one of the 200 addresses already in a loop is 0.98. The probability of this occurring 200 times is $0.98^{200}$ or 0.0176 (1 of 57). This probability can be made arbitrarily low by increasing the minimum loop length.

Figure 1:
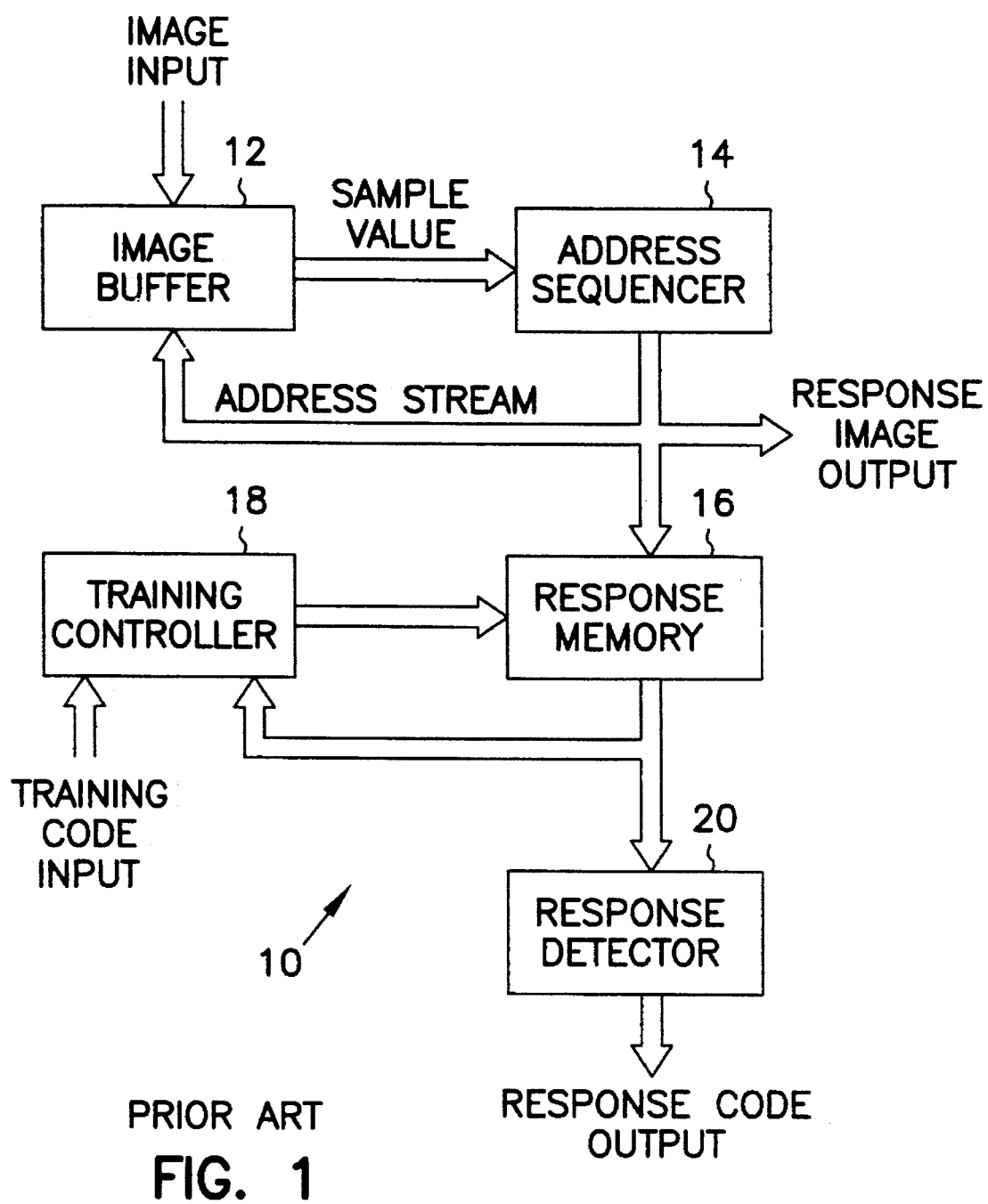
FIG. 1 is a block diagram of the prior art pattern processing system disclosed in U.S. Pat. No. 4,541,115.
Figure 3:
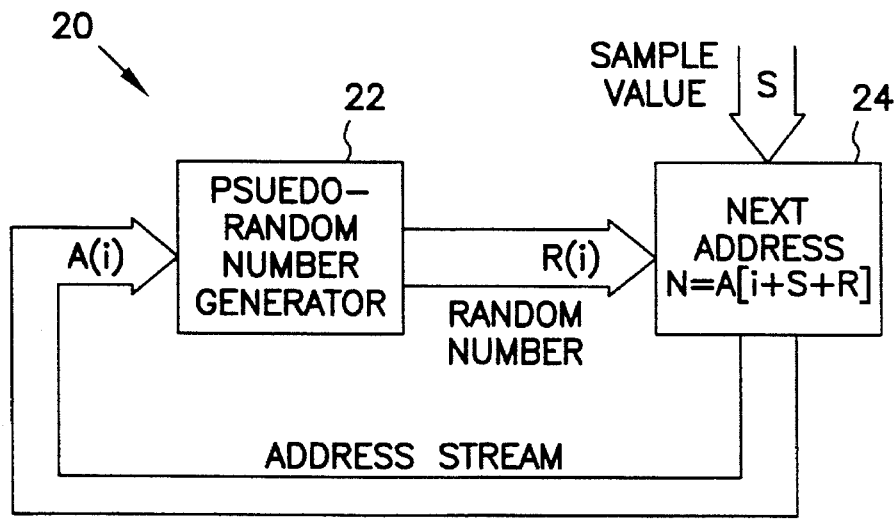
FIG. 3 is a block diagram of an improved address sequencer using a pseudo-random number generator according to the present invention.
Figure 4:
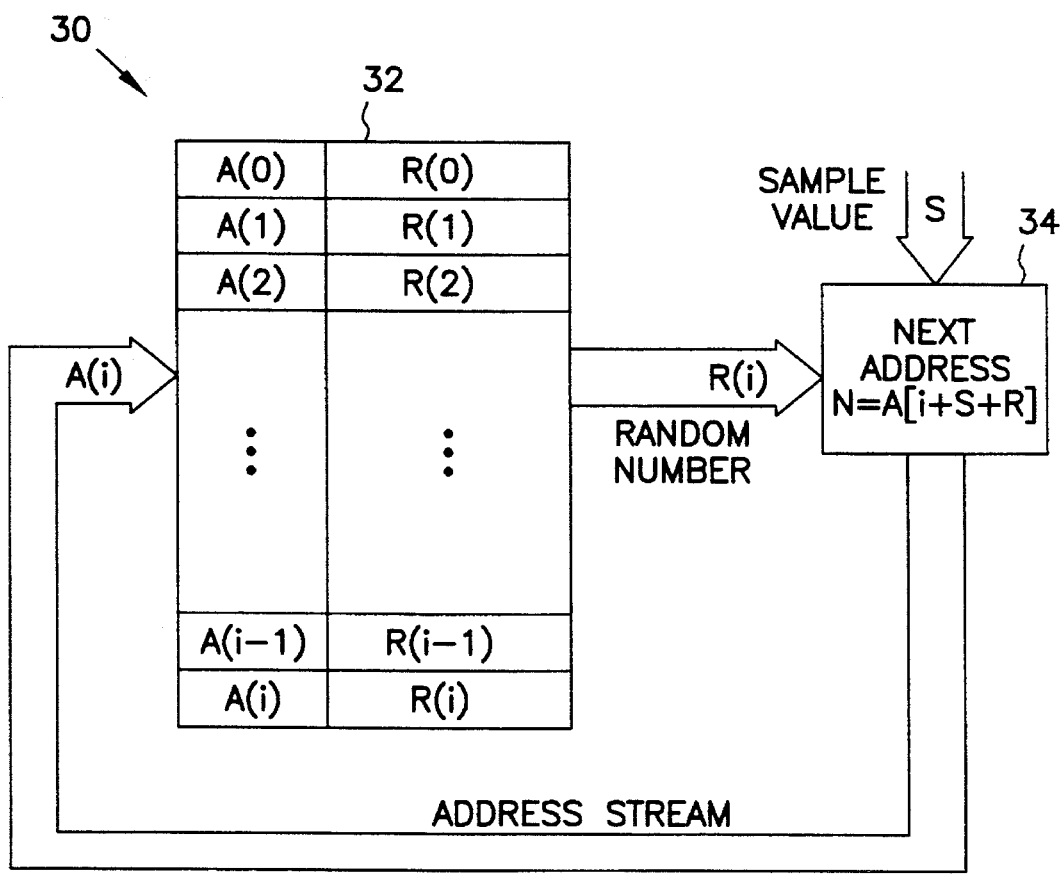
FIG. 4 is a block diagram of an improved address sequencer using an array memory according to the present invention.

As shown in alternate forms in FIGS. 3 and 4, the present invention provides an improved design for sequencer 14 of the prior art system 10. These alternate embodiments can control the minimum address loop length generated. In the embodiment of FIG. 3, the sequencer 20 includes a pseudo-random number generator 22 and a next address calculator 24; in the embodiment of FIG. 4, sequencer 30 uses a memory (or array) 32 holding a plurality of "random numbers" and a next address calculator 34. The second embodiment 30 is equivalent to the first embodiment 20 if the sequence of numbers generated by the pseudo-random number generator are sorted sequentially in memory. Accessing the memory 32 sequentially will produce the same random number sequence as the random number generator 22. In both cases, the sequence is continuous (or circular). That is, the sequence never ends, it just starts over from the beginning.

Both address sequencers 20 and 30 generate a next address based upon the current address and the value sampled using the current address. In embodiment 20, the current address is a random number from a pseudo-random generator 22; in the other embodiment 30, the current address is the number stored at a specific memory location in memory 32.

The following example will show how the minimum loop length of an address sequencer can be controlled using the system illustrated in FIG. 4. Let the address for memory 32 and the pattern memory or image buffer 12 be stored in a single dimensional array A[i] where i is an index from 0 to 16383 (total addresses 16,383). This array could contain the numbers generated in sequence from a 14-bit pseudo-random number generator. As the index exceeds 16383 it rolls over to the beginning as if it were a circular array.

The next address, N, can, for example, be set equal to A[i+S+R] where,

A[i]=current address

S=sampled value using current address (e.g. 0 or 1) and

R=Random increment derived

Typically R may be the lower 8 bits of the current address A[i], in which case R is a random number from 0 to 255. The average R is therefore 127, given a certain number of samples from the generator. If the sampled value is small compared to R, then the approximate number of next addresses generated before the index rolls over is $16383/127$, or 129 addresses. Clearly, any one address can not repeat until the index rolls over. Accordingly, generating addresses in this manner provides about 129 addresses in a loop, and in any event no more than $16383/255$, or about 64 addresses. This principle also works for the embodiment of FIG. 3, provided that the number generated by pseudo-random number generator 22 is constrained to an upper limit.

For either embodiment, once the sequencer 20 or 30 has stepped through S+R numbers, it can start using the addresses for the loop determination.

Figure 5:
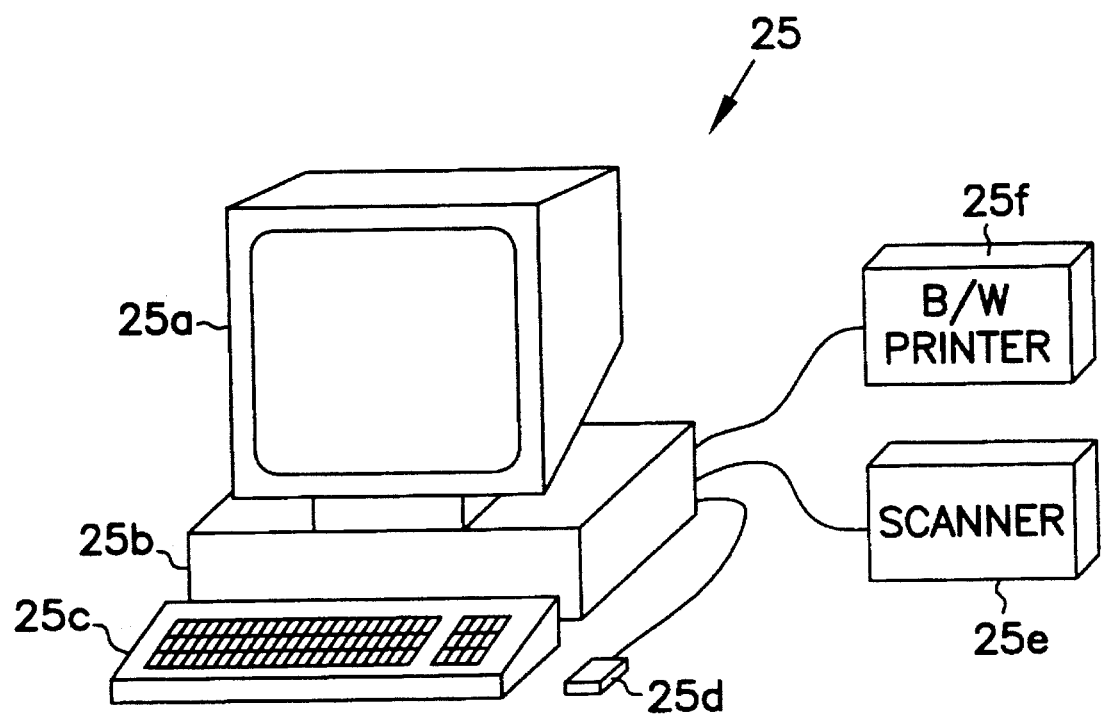
FIG. 5 is a simplified schematic diagram of a hardware platform for the software-implemented system, according to the present invention.
Figure 6:
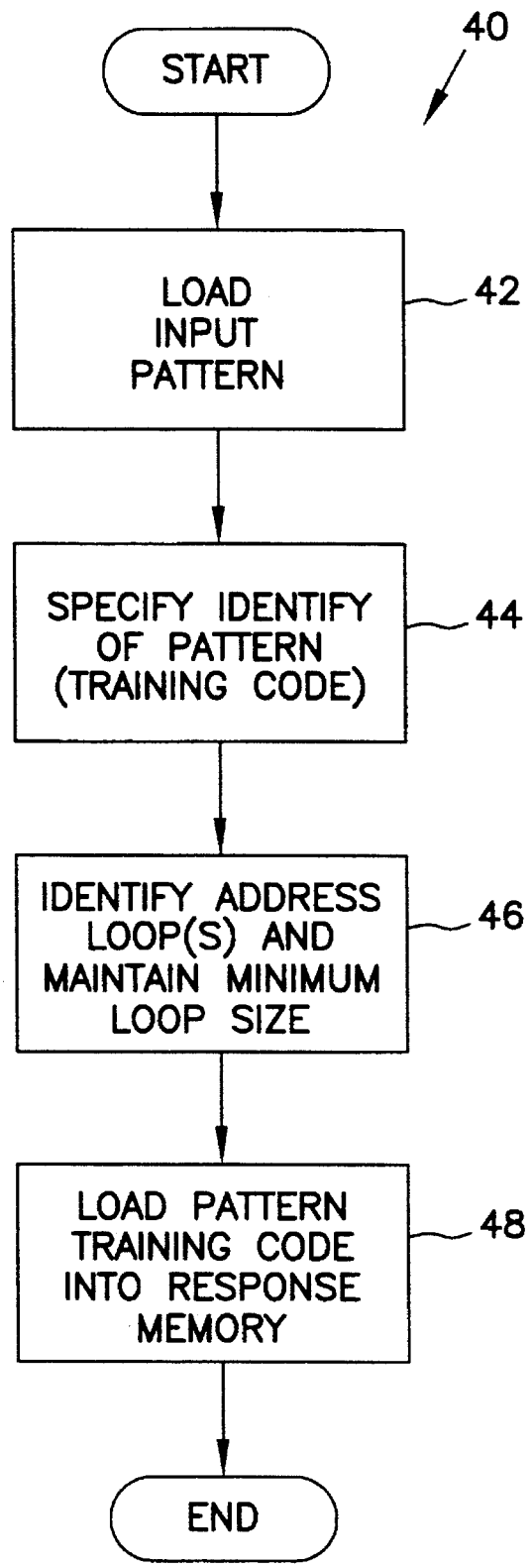
FIG. 6 is a flow chart of a software implementation of the learning module of the pattern processing system according to the present invention.
Figure 7:
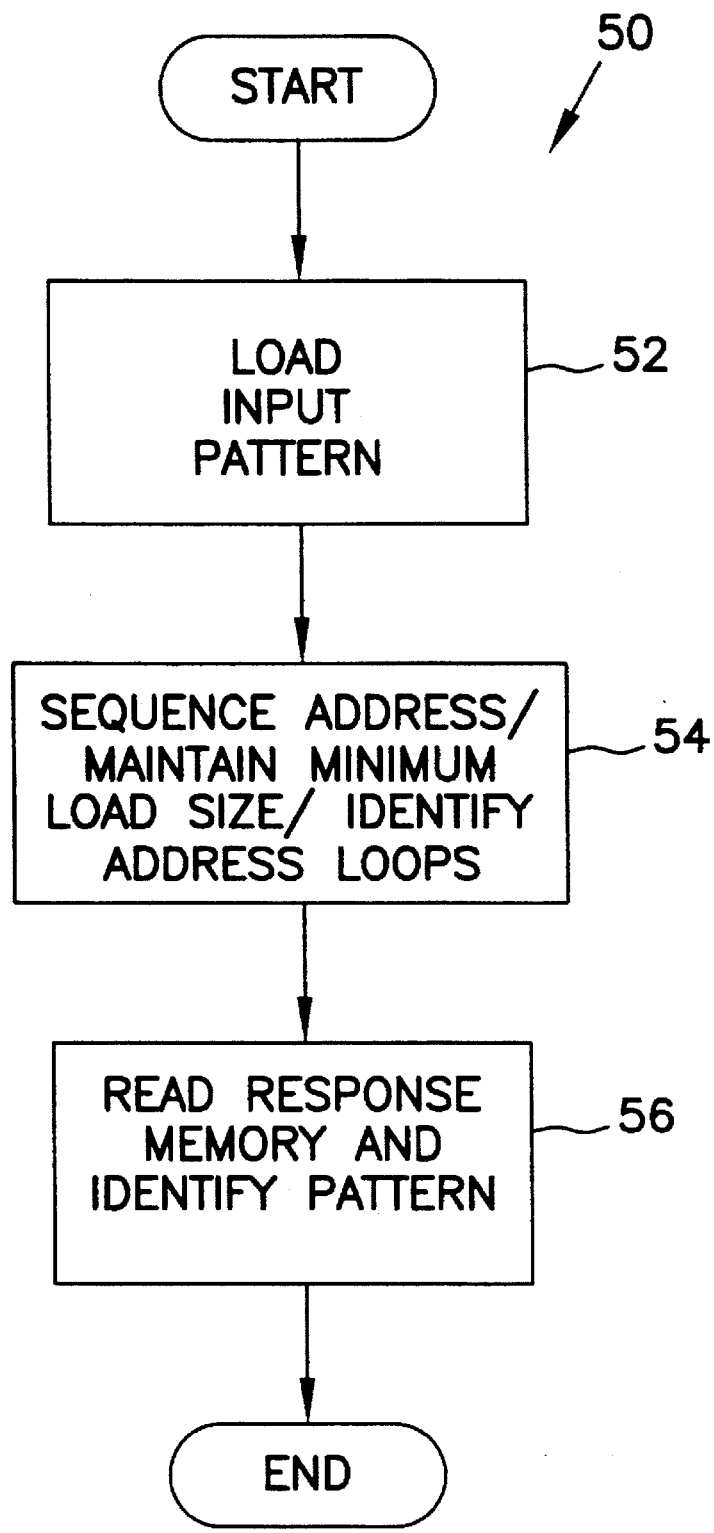
FIG. 7 is a flow chart of a software implementation of the recognition module of the pattern processing system according to the present invention.
Figure 8:
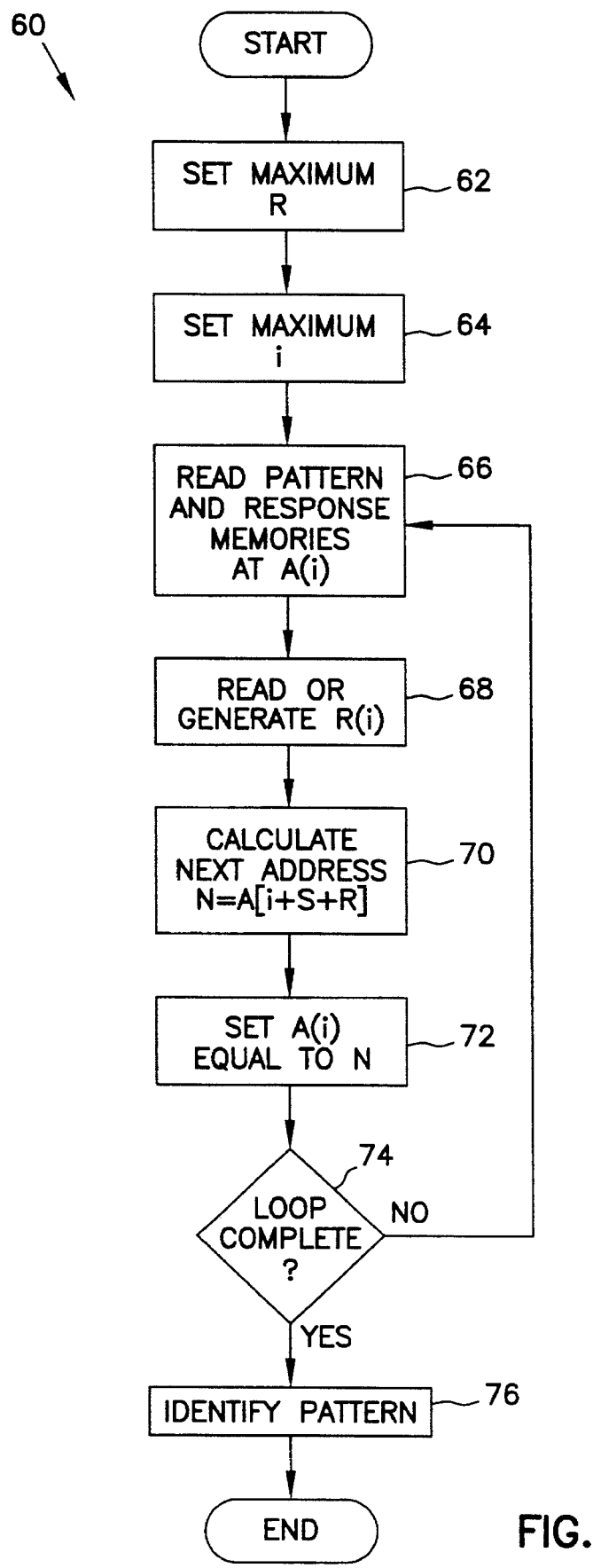
FIG. 8 is a block diagram of a software implementation of the address sequencers according to the present invention.

Software implementations of the invention are shown in FIGS. 6, 7 and 8. Such implementations are preferred, wherein the random access memory (RAM) of a workstation or PC is used to hold the image data and response data. Workstation or PC 25 is suitable as a platform for the software implementations of the invention is shown in FIG. 5. Of conventional construction, it preferably includes a monitor 25a, a chassis 25b containing the processing unit, random access memory (RAM) and mass storage, and/or a frame grabber for input of video images, a keyboard 25c, a mouse 25d, a black/white printer 25f, and a scanner 25e for scanning input patterns to be processed. Random numbers may be generated by a software driven pseudo-random number generator, or stored in RAM.

FIG. 6 shows a software implementation 40 of a learning module of the system of the present invention. The input pattern to be learned is loaded (42), the identity (training code) specified by the user (44), the address loops identified (maintaining a minimum size) (46), and the training code is loaded into a response memory or array (48).

FIG. 6 shows a software implementation 50 of a recognition module according to the present invention. The input pattern to be recognized is loaded into the buffer or pattern memory (52), the address sequencer is run (maintaining minimum loop length) to identify the address loop(s) (54), and the corresponding training codes are read from response memory is read to identify the pattern (56).

FIG. 8 shows a software implementation 60 of the address sequencers 20 or 30 according to the present invention. A maximum value of random number R(i) and i are set (62 and 64). The pattern and response memories are read at A(i) (66). R(i) is read or generated (68). A next address N is calculated as indicated above with regard to FIG. 3 or 4 (70). The next address A(i) is set equal to N (72). If the loop has repeated as required (74), the pattern is identified looking at the training codes stored in the response memory (76), else the address sequencing continues (66).

The present invention may be implemented in combination with the system for weighting training code entries disclosed in U.S. patent application Ser. No. 08/107,100, entitled "Pattern Processing System with Weighted Training Codes," filed Aug. 16, 1993, to Werth. Weighting the training code entries is useful for training the system to identify classes of patterns. Of course, the present invention is useful in any of the various modes disclosed in U.S. Pat. No. 4,541,115 to Werth. In yet another preferred alternate embodiment, the Werth system may be modified to provide that an input pattern be identified by multiple processing systems, each with different address loop generators to provide different address loops for the pattern in each system, with the processing systems "voting" as to the identification of the pattern. For example, if three systems identified the pattern as "A", and one as "B", "A" would be the identification.

Thus, there has been described an improved method and apparatus for address sequencing for the Werth system, whereby undesirable short loops are avoided, and recognition is improved.

What is claimed is:

1. A method of associating an input pattern with an output response, wherein the input pattern comprises a plurality of sample values, the method comprising:

producing the sample values based upon the input pattern;

storing the sample values of the input pattern in a first array of addressable locations;

sequentially addressing the first array with a sequence of addresses in which each next address of the sequence is determined by a preceding address of the sequence and the sample value stored at the addressable location of the first array corresponding to the preceding address, so that a repetitive address loop which is a function of the input pattern is generated as long as the input pattern remains unchanged, the address loop having a loop length;

modifying the repetitive address loop if necessary to actively maintain a predetermined minimum address loop length; and associating the output response with the address loop which is a function of the input pattern.

2. The method of claim 1 wherein associating the output response with the address loop comprises:

sequentially addressing a second array of addressable locations with the sequence of addresses;

storing a code representative of the output response at selected locations of the second array which are addressed by the sequence of addresses;

reading codes from the locations of the second array addressed by the sequence of addresses; and providing the output response based upon the codes read from the second array.

3. The method of claim 2 wherein each next address of the sequence has a plurality of possible address values based upon the preceding address, and wherein the next address is selected from among the possible address values based upon a sample value related to the preceding address.

4. The method of claim 1 wherein each next address of the sequence has a plurality of possible address values based upon the preceding address, and wherein the next address is selected from among the possible address values based upon a sample value related to the preceding address.

5. A method of associating a pattern with an output response, the method comprising:

sequentially sampling elements of the pattern to produce sample values representative of a characteristic of the elements sampled, the elements sampled being selected by a sequence of addresses in which each next address of the sequence is determined by a preceding address of the sequence and the sample value corresponding to the preceding address, so that a repetitive address loop which is a function of the pattern is generated as long as the pattern remains unchanged, the address loop having a loop length;

modifying the repetitive address loop if necessary to actively maintain a predetermined minimum address loop length; and associating the output response with the address loop which is a function of the pattern.

6. The method of claim 5 wherein associating the output response with the address loop comprises:

sequentially addressing a response memory with the sequence of addresses;

storing a code representative of the output response at selected locations of the response memory which are addressed by the sequence;

reading codes from locations of the response memory which are addressed by the sequence; and providing the output response based upon the codes read from the response memory.

7. A method according to claim 1, 2, 3, 4, 5 or 6 further wherein the minimum address loop length is selected to reduce the probability that multiple different repetitive loops are possible for the input pattern.

8. A method according to claim 1, 2, 3, 4, 5 or 6 wherein a next address is generated using a pseudo-random number generator which produces an address increment to add to a preceding address, and further wherein the address increment produced by the pseudo-random generator has an upper limit, resulting in a minimum number of addresses in an address loop.

9. A method according to claim 1, 2, 3, 4, 5 or 6 wherein the sequence of addresses is generated using an array holding a plurality of pseudo-random numbers which are used as address increments to add to a preceding address, and further wherein the address increments in the array have an upper limit, resulting in a minimum number of addresses in an address loop.

10. A pattern processing system for identifying an input pattern comprising:

addressable means for providing, for each of a plurality of addressable locations, a sample value representative of a characteristic of an input pattern at that addressable location;

address sequencer means for providing an address stream containing a sequence of addresses in which each next address of the sequence is determined by a preceding address and the sample value from the location corresponding to the preceding address; so that upon repetition of an address which has previously been provided in the sequence, the address stream cycles repetitively through an address loop of a predetermined minimum length which is a function of the input pattern for as long as the input pattern remains unchanged;

means responsive to the address stream for identifying the input pattern based upon the address loop which it causes to be provided by the address sequencer means.

11. The pattern processing system of claim 10 wherein the means responsive to the address stream comprises:

response memory means for storing codes in a second array of locations addressable by the address stream;

training controller means for selectively causing a predetermined training code to be associated with a selected input pattern to be written into the response memory means at locations of the second array addressed by the address stream when the selected input pattern is addressed by the address sequencer means; and response detector means for providing an output response based upon codes read out from locations of the second array addressed by the address stream.

12. The pattern processing system of claim 11 wherein the response detector means provides the output response based upon frequency of the codes read out from the response memory means.

13. The pattern processing system of claim 10 wherein each next address of the sequence provided by the address sequencer means has a plurality of possible values based upon the preceding address, and wherein the sample value from the location corresponding to the preceding address determines which of the plurality of possible values is provided by the address sequencer means as the next address.

14. A system according to claim 10, 11, 12 or 13 further wherein the address sequencer means includes a pseudo-random number generator which produces an address increment to add to a preceding address to produce a next address, and further wherein the address increment produced by the pseudo-random generator has an upper limit, resulting in a minimum number of addresses in an address loop.

15. A system according to claim 10, 11, 12 or 13 further wherein the address sequencer means includes an array holding a plurality of pseudo-random numbers which are used as address increments and means for adding the address increments to a preceding address, and further wherein the address increments in the array have an upper limit, resulting in a minimum number of addresses in an address loop.

16. A pattern processing system for identifying a pattern, the system comprising:

means for generating an address stream containing at least one sequence of addresses in which each next address of the sequence has a plurality of possible next address values based upon at least one preceding address, and wherein the next address is selected from among the possible next address values based upon at least one sample value related to the one preceding address so that at least one repetitive address loop of a predetermined minimum length and which is a function of the pattern is generated;

means for providing, in response to each address of the address stream, a sample value representative of a characteristic of a sampled element of a pattern corresponding to that address; and means for identifying the pattern based upon the sequence of addresses generated when the pattern is sampled as a function of addresses of the address stream.

17. The pattern processing system of claim 16 wherein the means for providing sample values comprises:

source means for providing sample values representative of the characteristics of the sampled elements of a pattern; and buffer means for storing the sample values in a first array of locations addressable by the address stream, the buffer means providing the sample values to the means for generating the address stream in response to the address stream.

18. The pattern processing system of claim 16 wherein the means for identifying the pattern comprises:

response memory means for storing codes in locations addressable by the address stream;

training controller means for selectively causing a predetermined training code associated with the pattern to be written into the response memory means at locations addressed by the address stream when the pattern is addressed by the address sequencer means; and response detector means for providing an output response based upon codes read out from locations of the response memory means addressed by the address stream.

19. The pattern processing system of claim 18 wherein the response detector means provides the output response based upon frequency of the codes read out from the response memory means.

20. A system according to claim 16, 17, 18 or 19 further wherein the means for generating an address stream includes a pseudo-random number generator which produces an address increment to add to a preceding address to produce a next address, and further wherein the address increment produced by the pseudo-random generator has an upper limit, resulting in a minimum number of addresses in an address loop.

21. A system according to claim 16, 17, 18 or 19 further wherein the means for generating an address stream includes an array holding a plurality of pseudo-random numbers which are used as address increments and means for adding the address increments to a preceding address, and further wherein the address increments in the array have an upper limit, resulting in a minimum number of addresses in an address loop.

22. A method of associating an input pattern with an output response, the method comprising:

storing data associated with the input pattern in a first array of addressable locations;

sequentially addressing the first array with a sequence of addresses in which each next address of the sequence is determined by a preceding address of the sequence and a sample value determined from data stored at the addressable location of the first array corresponding to the preceding address, so that a repetitive address loop which is a function of the input pattern is generated as long as the input pattern remains unchanged, the address loop having a loop length;

modifying the repetitive address loop if necessary to actively maintain a predetermined minimum address loop length: and associating the output response with the address loop which is a function of the input pattern.

23. The method of claim 22 wherein associating the output response with the address loop comprises:

sequentially addressing a second array of addressable locations with the sequence of addresses;

storing a code representative of the output response at selected locations of the second array which are addressed by the sequence of addresses;

reading codes from the locations of the second array addressed by the sequence of addresses; and providing the output response based upon the codes read from the second array.

24. The method of claim 23 wherein each next address of the sequence has a plurality of possible address values based upon the preceding address, and wherein the next address is selected from among the possible address values based upon a sample value related to the preceding address.

25. The method of claim 22 wherein each next address of the sequence has a plurality of possible address values based upon the preceding address, and wherein the next address is selected from among the possible address values based upon a sample value related to the preceding address.

26. A method of associating a pattern with an output response, the method comprising:

sequentially sampling data associated with the pattern to produce sample values representative of one or more characteristics of the pattern, the data sampled being selected by a sequence of addresses in which each next address of the sequence is determined by a preceding address of the sequence and the sample value corresponding to the preceding address, so that a repetitive address loop which is a function of the pattern is generated as long as the pattern remains unchanged, the address loop having a loop length;

modifying the repetitive address loop if necessary to actively maintain a predetermined minimum address loop length; and associating the output response with the address loop which is a function of the pattern.

27. The method of claim 26 wherein associating the output response with the address loop comprises:

sequentially addressing a response memory with the sequence of addresses;

storing a code representative of the output response at selected locations of the response memory which are addressed by the sequence;

reading codes from locations of the response memory which are addressed by the sequence; and providing the output response based upon the codes read from the response memory.

28. A method according to claim 22, 23, 24, 25, 26 or 27 further wherein the minimum address loop length is selected to reduce the probability that multiple different repetitive loops are possible for the input pattern.

29. A method according to claim 22, 23, 24, 25, 26 or 27 wherein a next address is generated using a pseudo-random number generator which produces an address increment to add to a preceding address, and further wherein the address increment produced by the pseudo-random generator has an upper limit, resulting in a minimum number of addresses in an address loop.

30. A method according to claim 22, 23, 24, 25, 26 or 27 wherein the sequence of addresses is generated using an array holding a plurality of pseudo-random numbers which are used as address increments to add to a preceding address, and further wherein the address increments in the array have an upper limit, resulting in a minimum number of addresses in an address loop.

31. A system according to claim 22, 23, 24, 25, 26 or 27 further wherein the address sequencer means includes an array holding a plurality of pseudo-random numbers which are used as address increments and means for adding the address increments to a preceding address, and further wherein the address increments in the array have an upper limit, resulting in a minimum number of addresses in an address loop.

32. A pattern processing system for identifying an input pattern comprising:

addressable means for providing, for each of a plurality of addressable locations, a sample value representative of a characteristic of an input pattern associated with that addressable location;

address sequencer means for providing an address stream containing a sequence of addresses in which each next address of the sequence is determined by a preceding address and the sample value from the location corresponding to the preceding address; so that upon repetition of an address which has previously been provided in the sequence, the address stream cycles repetitively through an address loop of a predetermined minimum length which is a function of the input pattern for as long as the input pattern remains unchanged; and means responsive to the address stream for identifying the input pattern based upon the address loop which it causes to be provided by the address sequencer means.

33. The pattern processing system of claim 32 wherein the means responsive to the address stream comprises:

response memory means for storing codes in a second array of locations addressable by the address stream;

training controller means for selectively causing a predetermined training code to be associated with a selected input pattern to be written into the response memory means at locations of the second array addressed by the address stream when the selected input pattern is addressed by the address sequencer means; and response detector means for providing an output response based upon codes read out from locations of the second array addressed by the address stream.

34. The pattern processing system of claim 33 wherein the response detector means provides the output response based upon frequency of the codes read out from the response memory means.

35. The pattern processing system of claim 32 wherein each next address of these sequence provided by the address sequencer means has as plurality of possible values based upon the preceding address, and wherein the sample value from the location corresponding to the preceding address determines which of the plurality of possible values is provided by the address sequencer means as the next address.

36. A system according to claim 32, 33, 34 or 35 further wherein the address sequencer means includes a pseudo-random number generator which produces an address increment to add to a preceding address to produce a next address increment to add to a preceding address to produce a next address, and further wherein the address increment produced by the pseudo-random generator has an upper limit, resulting in a minimum number of addresses in an address loop.

37. A pattern processing system for identifying a pattern, the system comprising:

means for generating an address stream containing at least one sequence of addresses in which each next address of the sequence has a plurality of possible next address values based upon at least one preceding address, and wherein the next address is selected from among the possible next address values based upon at least one sample value related to the one preceding address so that at least one repetitive address loop of a predetermined minimum length and which is a function of the pattern is generated;

means for providing, in response to each address of the address stream, a sample value representative of one or more characteristics of a sampled element of a pattern associated with that address; and means for identifying the pattern based upon the sequence of addresses generated when the pattern is sampled as a function of addresses of the address stream.

38. The pattern processing system of claim 37 wherein the means for providing sample values comprises:

source means for providing sample values representative of the characteristics of sampled elements of a pattern; and buffer means for storing the sample values in a first array of locations addressable by the address stream, the buffer means providing the sample values to the means for generating the address stream in response to the address stream.

39. The pattern processing system of claim 37 wherein the means for identifying the pattern comprises:

response memory means for storing codes in locations addressable by the address stream;

training controller means for selectively causing a predetermined training code associated with the pattern to be written into the response memory means at locations addressed by the address stream when the pattern is addressed by the address sequencer means; and response detector means for providing an output response based upon codes read out from locations of the response memory means addressed by the address stream.

40. The pattern processing system of claim 39 wherein the response detector means provides the output response based upon frequency of the codes read out from the response memory means.

41. A system according to claim 37, 38, 39 or 40 further wherein the means for generating an address stream includes a pseudo-random number generator which produces an address increment to add to a preceding address to produce a next address, and further wherein the address increment produced by the pseudo-random generator has an upper limit, resulting in a minimum number of addresses in an address loop.

42. A system according to claim 31, 38, 39 or 40 further wherein the means for generating an address stream includes an array holding a plurality of pseudo-random numbers which are used as address increments and means for adding the address increments to a preceding address, and further wherein the address increments in the array have an upper limit which guarantees a minimum number of addresses in an address loop.

* * * * *

UNITED STATES PATENT AND TRADEMARK OFFICE
CERTIFICATE OF CORRECTION

PATENT NO. : 5,473,708
DATED : December 5, 1995
INVENTOR(S) : Larry J. Werth

It is certified that error appears in the above-indentified patent and that said Letters Patent is hereby corrected as shown below:

Column 4, line 41, delete "$(Y_x i)$" and insert therefor --$Y_{(x}i_)$--.

Column 4, line 43, delete "$Z_{(xi)}$" and insert therefor --$Z_{(x}i_)$--.

Column 4, line 51, delete "$y(_x i) = iz_x i$" and insert therefor --$Y_{(x}i_) = iz_{(x}i_)$--.

Column 4, line 53, delete "$(Y_x i)$" and insert therefor --$y(x^i)$--.

Column 4, line 56, delete "$(Z_x i)$" and insert therefor --$Z_{(x}i_)$--.

Column 4, line 56, delete "$yx^i$" and insert therefor --$y_x i$--.

Column 5, line 3, delete "$Xp(_x i)$" and insert therefor --$Xp_{(x}i_)$--.

Column 8, line 17, delete "FIG. 6" and insert therefor --FIG. 7--.

Column 12, line 15, delete ":" and insert therefor --;--.

Column 15, line 2, delete "31" and insert therefor --37--.

Signed and Sealed this

Twenty-second Day of April, 1997

*Attest:*

BRUCE LEHMAN

*Commissioner of Patents and Trademarks*

*Attesting Officer*